No. 741,084. PATENTED OCT. 13, 1903.
W. L. WALTER.
WAVE MOTOR.
APPLICATION FILED APR. 12, 1901.
NO MODEL. 4 SHEETS—SHEET 1.

Witnesses
J. M. Pond
D. E. Burdual

Inventor:
William L. Walter
by Dodge Sons,
Attorneys

No. 741,084. PATENTED OCT. 13, 1903.
W. L. WALTER.
WAVE MOTOR.
APPLICATION FILED APR. 12, 1901.
NO MODEL. 4 SHEETS—SHEET 2.
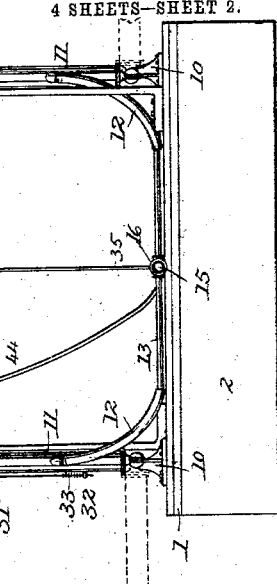
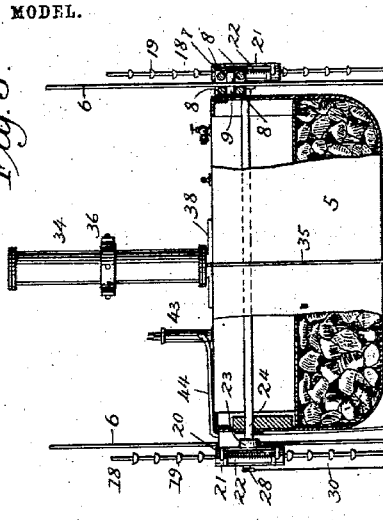
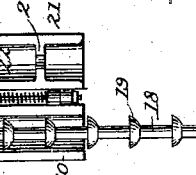
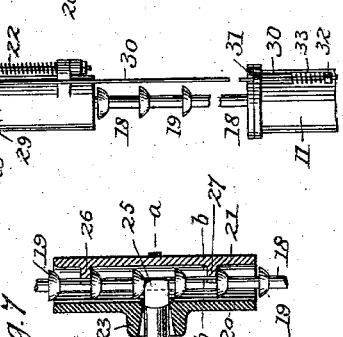
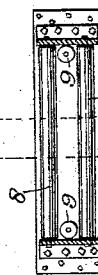
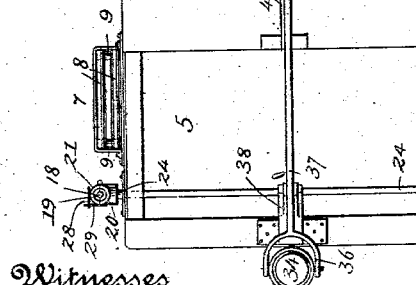

No. 741,084. PATENTED OCT. 13, 1903.
W. L. WALTER.
WAVE MOTOR.
APPLICATION FILED APR. 12, 1901.
NO MODEL. 4 SHEETS—SHEET 3.

Witnesses
J. M. Pond
D. E. Burdine

Inventor:
William L. Walter,
by Dodge and Sons
Attorneys

No. 741,084. PATENTED OCT. 13, 1903.
W. L. WALTER.
WAVE MOTOR.
APPLICATION FILED APR. 12, 1901.
NO MODEL. 4 SHEETS—SHEET 4.

No. 741,084. Patented October 13, 1903.

UNITED STATES PATENT OFFICE.

WILLIAM L. WALTER, OF PORT HURON, MICHIGAN, ASSIGNOR OF ONE-HALF TO MARCIA M. RICHARDSON AND SAMUEL W. SMITH, OF PONTIAC, MICHIGAN.

WAVE-MOTOR.

SPECIFICATION forming part of Letters Patent No. 741,084, dated October 13, 1903.

Application filed April 12, 1901. Serial No. 55,516. (No model.)

*To all whom it may concern:*

Be it known that I, WILLIAM L. WALTER, a citizen of the United States, residing at Port Huron, in the county of St. Clair and State of Michigan, have invented certain new and useful Improvements in Wave-Motors, of which the following is a specification.

My present invention relates to wave-motors, the construction and advantages of which will be hereinafter set forth, reference being had to the annexed drawings, wherein—

Figure 1:
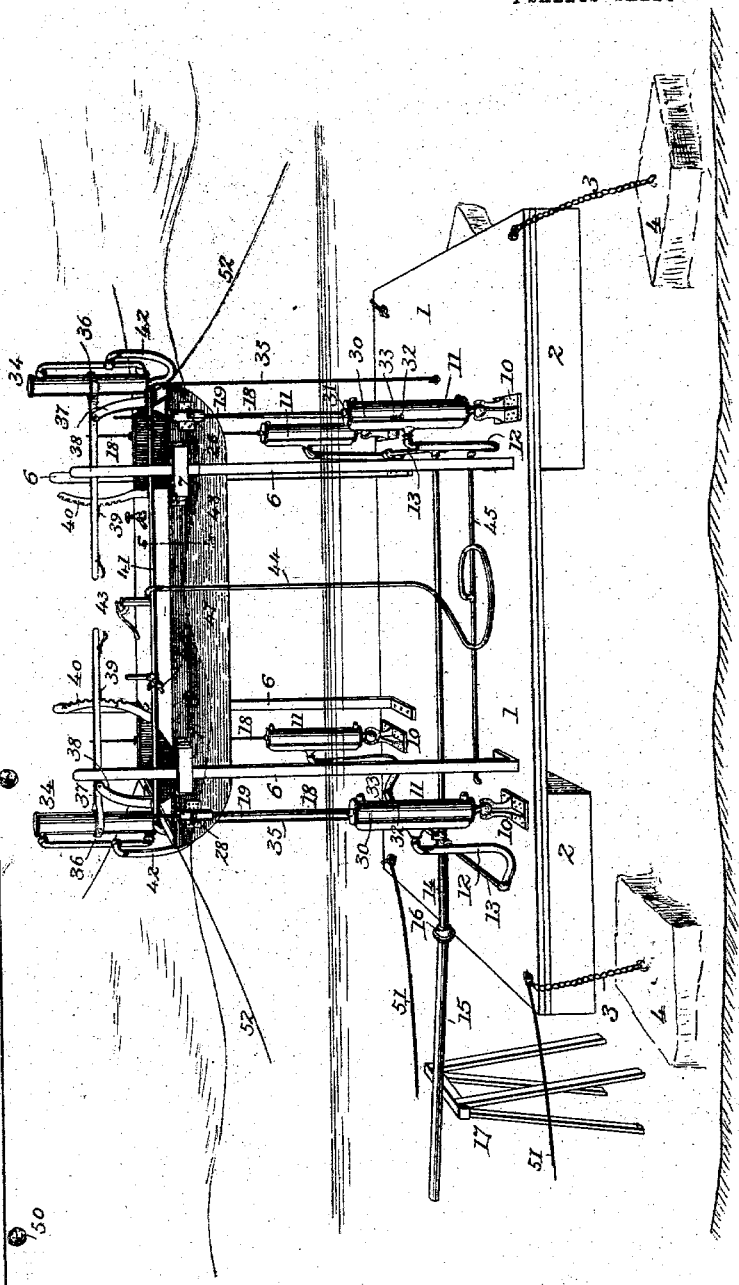
Figure 10:
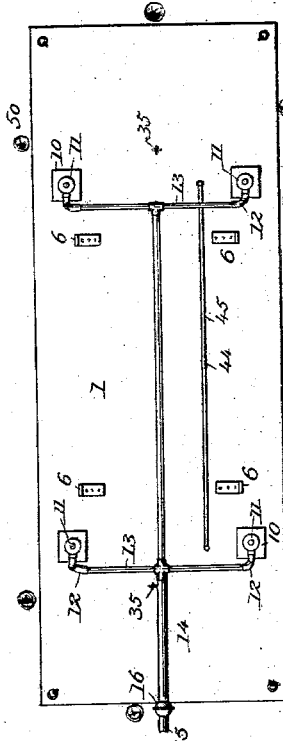
Figure 11:
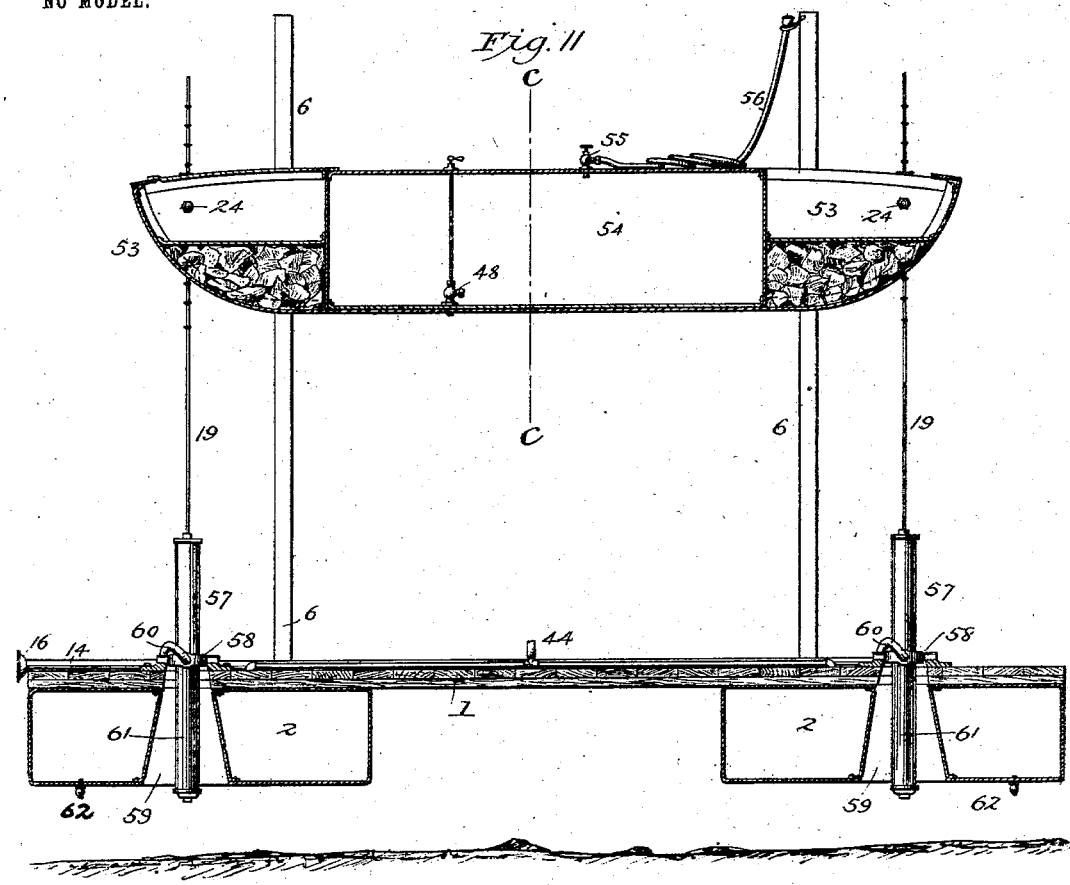
Figure 12:
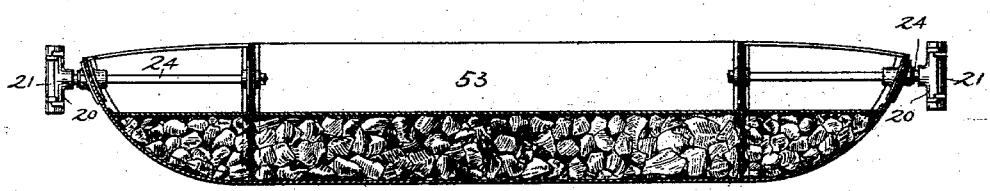
Figure 13:
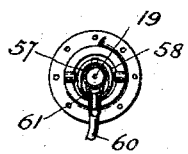
Figure 14:
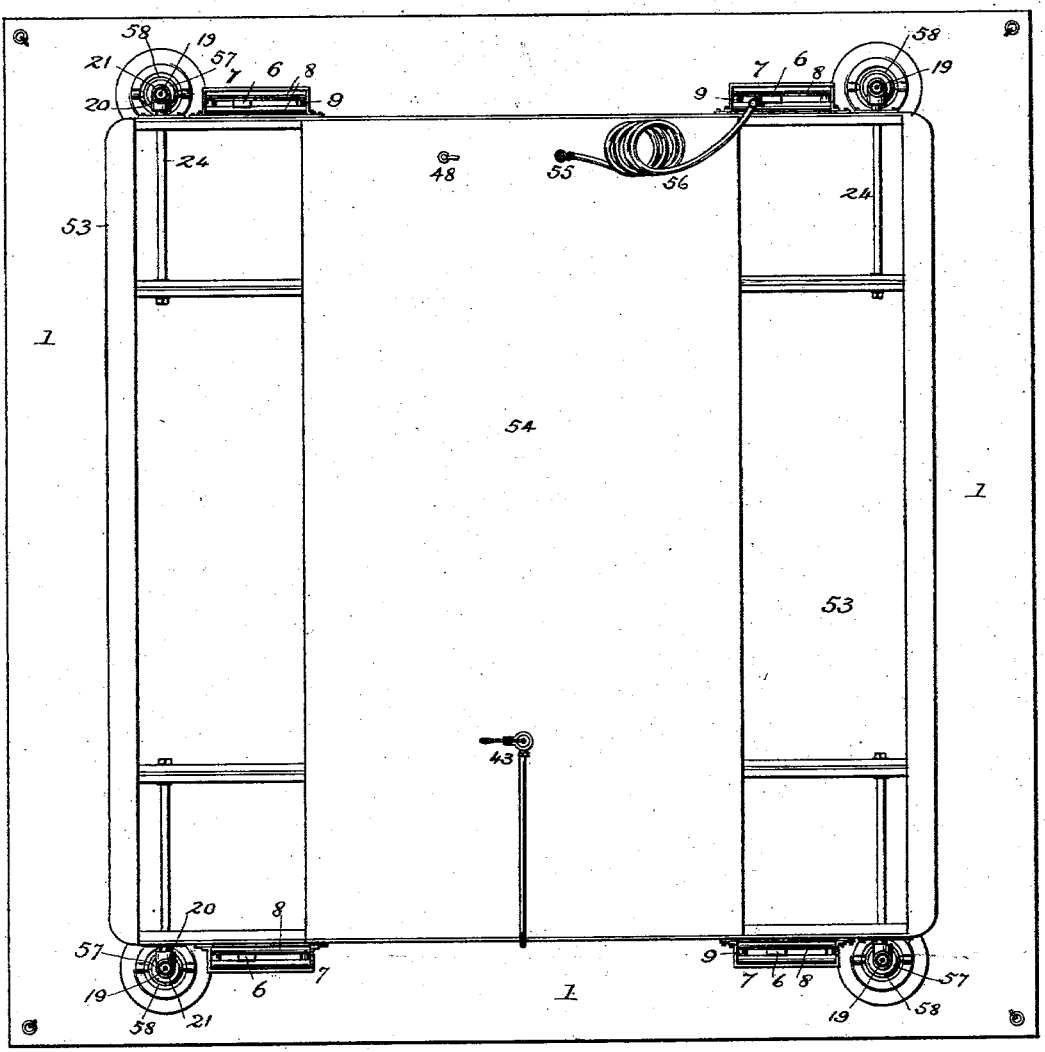

Figure 1 is a perspective view of the apparatus as a whole; Fig. 2, a top plan view of the same; Fig. 3, an end elevation, partly in section; Fig. 4, a sectional detail of one of the guides or ways; Fig. 5, a side elevation of one of the piston-rod-retaining boxes or castings; Fig. 6, a similar view showing the box open; Fig. 7, a vertical sectional view of the same; Fig. 8, a transverse sectional view on the line $a\ a$ of Fig. 7; Fig. 9, a similar view on the line $b\ b$; Fig. 10, a top plan view of the submerged float, a different means from that shown in Fig. 1 being employed to maintain the float in its position relative to the shore; Fig. 11, a sectional view of a slightly-modified form of construction; Fig. 12, a sectional view on the line $c\ c$ of the boat shown in Fig. 11; Fig. 13, a sectional view of the cylinder, Fig. 11, showing the gimbal-joint connection; and Fig. 14, a top plan view of the boat.

The main object of the present invention is to provide means whereby the rising and falling movements imparted to a boat or float by the waves may be utilized to the greatest advantage; and to that end it consists in the employment of power storing and transmitting means adapted and arranged to be operated both by the rise and fall of the boat or floating body.

A further object of the invention is to provide a suitable submerged float or member against which the boat or floating member may work, the submerged float being to all intents and purposes a fixed body or abutment resisting the movements of the floating body, and thereby enabling said floating body to impart its motion to suitable pumps or the like interposed between the body and the float.

A still further object of the invention resides in the provision of means for automatically releasing the piston-rods of the pumps or compressors when undue or excessive motion is imparted to the floating member or boat.

Objects and advantages other than those above set forth are present and will appear in the following description.

Referring to the drawings, 1 indicates the submerged member, which in the form shown consists of two air-tight tanks or compartments 2, connected together by suitable cross timbers or plates, as may be desired. By the employment of the air-compartments the submerged member becomes, in effect, a float, and to hold it in its submerged fixed position chains 3, connected to stone cribs 4, anchors, or the like, are employed. The air in the compartments tends constantly to elevate the float, and consequently holds the chains taut, the float being thereby maintained in a fixed position and tending to resist at all times any force which may be exerted against the same to either depress or elevate it. In effect, it becomes a fixed plane or abutment.

A suitable boat or float 5 is provided, said boat being maintained in its position immediately over the submerged float 1 by means of bars or guide members 6, which are secured at their lower ends to the member 1 and extending through suitable guides 7, secured upon the side of the boat. Said guides are by preference provided with longitudinally-extending rolls 8 and end rolls 9, the guide being of such length as to permit the rods to have more or less play, so that there will be no binding or cramping as the boat rises and falls with the motion of the waves. The guide-rods are by preference likewise formed so that they will yield or spring laterally, thereby compensating for any sidewise movement of the boat which may take place by reason of change of tide, current, direction of wind, or the like.

Mounted upon the submerged float or member 1 are suitable brackets or foot-pieces 10, to which are connected pump-cylinders 11, the connection between the parts being a universal one, so that the cylinder may be free to rock or tilt as working conditions may require. The pumps may be of any approved type or form. In practice it is proposed to employ four of such pumps, one in line with each corner of the boat. The discharge of each pump is connected by a flexible pipe 12, such as heavy rubber piping, and a branch 13 to a main 14, said main in turn being connected to a shore line or pipe 15 by a universal coupling 16. The shore pipe 15 is supported upon a series of horses or trestles 17, one of which is shown in Fig. 1. By the employment of the universal and flexible connections shown the parts will all adjust themselves to working conditions and be free of all strains whatsoever.

The piston-rods 18 of the pump and their connections are designed to be the same in construction, and a description of one will suffice for all. The upper end of the rod is provided with a series of stops or buttons 19, flat upon their upper face and rounded, as shown, on the lower face. The rod passes up through a box or casing comprising two parts 20 and 21, hinged together, with a spring 22 tending to normally hold the members apart or open, as shown in Fig. 6. The member 20 is provided near its mid-length with a hollow boss or extension 23, the opening therein flaring toward the outer end. Passing through the opening is a stem or bolt 24, which is securely attached to the boat or float 5 and forms the support for the piston-rod box or casing. The outer end 25 of the stem or bolt is forked and, as shown in Figs. 6, 7, and 8, embraces the piston-rod, the rounded under face of one of the disks 19 bearing on the corresponding rounded face of the forked end of the bolt.

The door or hinged member 21 of the box or casing is formed with shoulders 26 and 27, which are so spaced as to just pass over two of the stops or buttons 19 when the door is closed and the fork 25 is beneath an intervening button. This relation of the parts is best shown in Fig. 7. The shoulders 26 and 27, together with the fork 25, securely hold the piston-rod and cause it to partake of the motion of the boat 5. By reason of the flared construction of the opening formed in the boss 23 and the rounded bearing formed between the bearing-faces of the bolt and the wall of the member 20 (see Figs. 7 and 8) the boat may tip or rock slightly without straining the rod or its sustaining-box. To maintain the door or hinged member 21 closed, there is provided a spring-pressed latch 28, one end of which engages a keeper 29, carried by the member 20. The other end of the latch is connected to a rod 30, which passes down through a guide 31, carried upon the cylinder 11. The lower end of the rod is provided with a stop 32, above which is placed a spring 33. Normally the latch holds the parts closed; but should there be an excess upward movement imparted to the piston-rod the latch would be released by reason of the stop limiting the movement of the rod, spring 33 serving to cushion the action of the parts. Immediately the latch is released the spring 22 will throw the door 21 open, permitting the rounded face of the stop disk or button 19 to slip off the rounded end of the fork 25, thus allowing the boat and the casing or box to move up independent of the rod. By having the casing or box so that it may be opened the attendant may readily change the relative adjustment of the box and rod to suit the varying tide conditions.

In order to fully utilize the motion of the boat to the conservation of power, there is mounted at each end thereof a pump or compressor 34, its piston 35 extending down and being connected to the submerged float or abutment, as shown in Fig. 1. The pump or compressor is carried by a gimbal 36, the outer member 37 of which is pivotally connected to a bracket or arm 38, extending up from the deck of the boat. Member 37, which, in effect, is a lever, is provided with a locking-dog 39, working in conjunction with a segmental rack 40, so that the pump or compressor may be raised or lowered to meet tide conditions and maintain its piston in proper position. In practice the compressor 34 will serve to compress air and will be connected to a common main or pipe 41 by flexible connections 42. The main will be in turn connected to a conduit leading to shore or to any other desired point.

A hand-pump 43 is mounted on the boat and is connected by a hose 44 and pipe 45 with the air-tight compartments 2 of the submerged float. If desired, hose 44 may be connected by valved branch 46 with the main 41, leading from the air-compressors.

By preference boat 5 is provided with an air-tight compartment 47 at its center, while the end sections or portions will be closed by suitable hatches.

In rough weather it may be desirable to sink the boat, or at least permit it to drop down to a stratum of water which is comparatively still, and to this end a valve 48 is provided in the boat to admit water thereto in order to weigh it down, the compressed air being released from the air-tight compartment 47. When this is done, the rods 18 must of course be released from the boxes or casings and the compressors 34 released from their connections and permitted to drop down into the water. A chain or cable (not shown) must of course be attached to the compressors and made fast to the boat to enable them to be readily raised when the boat is again elevated.

In Fig. 10 piles 50 are indicated and are intended to take the place of the stone cribs or anchors 4. (Shown in Fig. 1.)

Lines 51 will be attached to the submerged float and lead to shore or to anchors or piles suitably placed. Similar lines 52 will be attached to the boat or float 5 to assist in maintaining it in its proper position.

The employment of a submerged float, as described, presents many advantages, the chief one of which is the inherent ability of the said member to shift or move in a substantially horizontal plane with the current or undertow and in a measure partake of the side or endwise movements of the boat, while at the same time resisting the up-and-down motion of the boat, and consequently forming a fixed abutment against which the boat can act. The slight movement of which the submerged member may partake is sufficient to relieve the guides 6 of much strain to which they would otherwise be subjected.

A slightly-modified form of the apparatus is shown in Figs. 11 to 14, inclusive. In said figures the boat 53 is shown as rectangular in form, with each side curved upward, forming prows upon all sides, this permitting the boat to rock or tilt properly no matter what be the direction of the wave motion, thus doing away with the necessity of shifting the position of the boat when a change occurs. The boat is shown with an air-tight compartment 54, a valve 55 opening into the same, said valve being connected to a hose 56. The upper end of the hose is secured to one of the guides 6, so that it may always be accessible. A valve 48, similar to that shown in Fig. 1, is provided for the admission of water to the compartment when it is desired to sink the boat, said valve and valve 55 being opened at the same time. When it is desired to raise the boat, all that it is necessary to do is to force air into the compartment, the water being forced out through valve 48, and when the boat is floated said valve 48 is of course closed.

The boxes or casings for the piston-rods are the same as those above described, the bolts or supporting members of the box being shown as extending inwardly and connected to one of the upright partitions or walls of the boat. (See Fig. 12.)

The power-cylinders 57 are in this construction shown as extending through the submerged float. They are supported by suitable gimbal-joints 58, the openings 59 in the float being of such shape and dimensions as to permit the cylinder to rock without coming into contact with the walls of the float. Pipes 60 lead from channels or pipes 61, passing from the lower ends of the cylinders to a main, as in the above-described construction.

An air-pump with suitable connections is provided, as above, to supply air to the air-compartments of the submerged float, a check-valve 62 opening into the compartments to permit the outflow of water therefrom previously admitted to the compartments to assist in sinking the float to its proper level.

While there are shown a series of pumps interposed between the boat and abutment, still it is manifest that but one pump or power-translating device could be employed.

It is of course to be understood that the length of the cylinders of the pumps and compressor is such that they will allow of maximum movement of the boat without the pistons coming into contact with the cylinder-heads.

The action of the apparatus is apparent. As long as any motion is imparted to the boat the pumps and compressors will act, the submerged float acting as a fixed abutment in a vertical direction, resisting any push or pull to which it may be subjected, thus causing the entire rise and fall of the boat to impart a corresponding movement to the pumps and compressors, forcing water under pressure or compressed air to any desired point, where it may be directly utilized or stored for future use. The stability of the submerged member is an essential element in an apparatus of this character. Furthermore, its adaptability in partaking of sidewise movement to a limited extent is likewise important in preventing undue straining of the parts.

In the use of the terms "pump" and "compressor" I do not intend to restrict the invention in any sense, the terms being employed in their broadest meaning. They are to be treated as the equivalent of the term "motor" or any power-translating device.

It is likewise immaterial what be the fluid acted upon by the pumps or compressors. The term "boat" is likewise to be treated in its broadest sense.

Having thus described my invention, what I claim is—

1. In a wave-motor, the combination of a submerged member having air chambers or compartments; means for holding said member in a submerged position; a boat; guides for the boat extending up from the submerged member, said guides being constructed to permit a slight lateral deflection thereof; and power-translating devices intermediate the submerged member and the boat.

2. In a wave-motor, the combination of a submerged member having air chambers or compartments; means for holding said member in a submerged position; a boat; guides for said boat extending up from the submerged member; a series of pumps universally connected to said submerged member; piston-rods extending up from said pumps; and adjustable connections intermediate said rods and the boat.

3. In a wave-motor, the combination of a submerged member; means for maintaining it in position; a boat; means for maintaining said boat in a position over the submerged member; power-translating means intermediate said member and the boat; and means for disconnecting the power-translating means from the boat when an excessive upward movement is imparted to the boat.

4. In a wave-motor, the combination of a submerged member having air chambers or compartments; means for holding said member in a submerged position; a boat; guides for said boat extending up from the submerged member; cylinders universally connected to said submerged member; piston-rods extending up from said cylinders; and a yielding connection intermediate said rods and the boat.

5. In a wave-motor, the combination of a submerged member having air chambers or compartments; means for holding said member in a submerged position; a boat; guides for said boat; a series of pump-cylinders universally connected to the submerged member; piston-rods extending up from said cylinders; and a yielding and adjustable connection intermediate said rods and the boat.

6. In a wave-motor, the combination of a submerged member; a boat; guides for said boat for maintaining it in position over the submerged member; a cylinder connected to said submerged member; a piston-rod extending up from said cylinder and provided with a series of stops; a shell or casing surrounding said piston-rod and engaging the stops on the rod; and connections intermediate the shell and the boat.

7. In a wave-motor; the combination of a submerged member; a boat; means for maintaining said boat in position over the submerged member; a cylinder connected to said submerged member; a piston-rod extending up from said cylinder; adjustable connections intermediate said rod and the boat; and means for disconnecting said connections when the boat is raised too high.

8. In a wave-motor, the combination of a submerged member; means for holding said member in a submerged position; a boat; guides for said boat extending up from said submerged member; a series of cylinders universally connected to said submerged member; piston-rods extending up from said cylinders; adjustable connections between said rods and the boat; a second series of cylinders; universal and adjustable connections intermediate said cylinders and the boat; and piston-rods extending from said cylinders down to and connected with said submerged member.

9. In a wave-motor, the combination of a submerged member; means for maintaining said member in a submerged position; a boat; power-translating devices intermediate said boat and the submerged member; means accessible from the boat for disconnecting said power-translating devices therefrom; and means for maintaining the boat in its proper position over the submerged member when the boat is disconnected from the translating devices.

10. In a wave-motor, the combination of a submerged member; means for maintaining said member in a submerged position; a boat; guides extending up from the submerged member to the boat; a series of pumps universally connected to said submerged member; piston-rods extending up from said pumps; a series of stops carried by said rods; and a two-part shell or casing for engaging said rods and stops, said casing comprising a member 20 connected to the boat by a bolt having a forked end 25 passing through said member 20, and a hinged member provided with shoulders adapted and arranged to engage the stops on the rod, substantially as described.

In testimony whereof I have signed my name to this specification in the presence of two subscribing witnesses.

WILLIAM L. WALTER.

Witnesses:
HORACE A. DODGE,
HARRY E. WALTER.